United States Patent [19]
Fujita

[11] 4,183,070
[45] Jan. 8, 1980

[54] ELECTROMAGNET FOR DEGAUSSING RECORD-REPRODUCE HEADS

[75] Inventor: Motoyoshi Fujita, Chiba, Japan

[73] Assignee: TDK Electronics Co., Ltd., Tokyo, Japan

[21] Appl. No.: 896,776

[22] Filed: Apr. 17, 1978

[30] Foreign Application Priority Data

Sep. 21, 1977 [JP] Japan ............... 52/126101[U]

[51] Int. Cl.² .................... G11B 5/46; G11B 27/24
[52] U.S. Cl. ........................... 360/128; 360/122; 361/267
[58] Field of Search ............... 360/128, 137, 122; 361/267, 149; 335/284, 285, 289, 293, 296, 297

[56] References Cited

U.S. PATENT DOCUMENTS

| | | | |
|---|---|---|---|
| 3,369,081 | 2/1968 | Atsumi | 360/128 |
| 3,439,922 | 4/1969 | Howard | 360/137 |
| 3,655,924 | 4/1972 | Puskas | 360/137 |
| 3,700,826 | 10/1972 | O'Neal | 360/137 |
| 3,810,230 | 5/1974 | Orlowski | 361/267 |
| 4,100,584 | 7/1978 | Behr et al. | 360/122 |
| 4,135,219 | 1/1979 | Yoshizawa | 361/267 |

*Primary Examiner*—Jay P. Lucas
*Attorney, Agent, or Firm*—Cooper, Dunham, Clark, Griffin & Moran

[57] ABSTRACT

An electromagnet for degaussing a magnetic head and which includes a yoke having a gap and one or more coils wound thereon is characterized by the middle portion of the yoke face, at and adjacent to said gap, being wider than the magnetic tape that passes by the magnetic head, and by the side portions of said yoke face, away from said gap, being narrower than the tape.

4 Claims, 3 Drawing Figures

ELECTROMAGNET FOR DEGAUSSING RECORD-REPRODUCE HEADS

BACKGROUND AND BRIEF DESCRIPTION OF THE INVENTION

This invention relates to electromagnets for degaussing, or rendering de-magnetized, record-reproduce heads in tape recorders, e.g.

The record-reproduce head of a tape recorder generally has a propensity for picking up magnetism, that is, becoming magnetized in the course of its service, so that its record-reproduce characteristic deteriorates gradually on account of the unwanted magnetism growing in the head. In order to avoid this deterioration, it is necessary to periodically degauss the head. Such degaussing is conventionally accomplished by using a head-degaussing electromagnet. In one known method, the electromagnet is energized to generate a constant alternating magnetic field. This electromagnet is first located close to the head face, that is, the surface which is in sliding contact with the magnetic tape, and is then moved away from said face. In another known method, the electromagnet is located close to the head face; it is first energized fully to produce a strong alternating magnetic field and is gradually de-energized to atrophy its magnetic field to zero. These methods, however, are accompanied by drawbacks since in tape recorders and similar devices, a tape guide for guiding a running tape in the given path or track of sliding movement along the head face is located in the vicinity of the head. The position of the guide relative to the head is necessarily such that it impedes the degaussing action if the yoke of the electromagnet is sized wider than the tape. On the other hand, if its yoke is sized narrower than the tape, the ends of the track part of the head face receive inadequate degaussing action.

This invention overcomes these drawbacks by providing an electromagnetic as will positively and reliably degauss record-reproduce heads in magnetic tape devices, including tape recorders, already in existence. A yoke face is employed which is wider than the magnetic tape, in the region at and adjacent to the gap, and narrower than the tape in side regions remote from the gap.

Examples of a presently preferred head-degaussing electromagnetic embodying this invention will be described in reference to the attached drawings.

DETAILED DESCRIPTION

Figure 1:
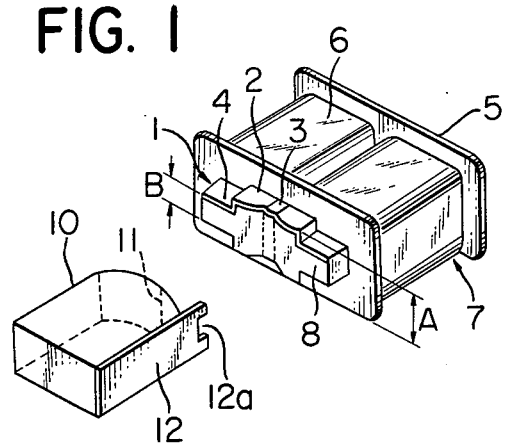
FIGS. 1 and 3 are perspective views of head-degaussing electromagnetic assemblies embodying the invention.
Figure 2:
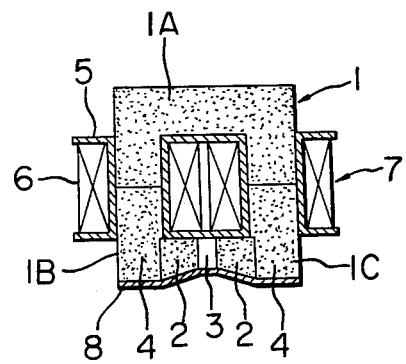
FIG. 2 is a sectional view of the assembly of FIG. 1.

In FIGS. 1 and 2, respectively, showing a degaussing electromagnet in perspective and in section taken at the horizontal center plane thereof, yoke 1 is made of a magnetic material, such as ferrite, and includes core segments 1A, 1B, 1C and 2. Segment 1A is in the shape of a letter "C" having two legs. Segments 1B and 1C form extensions of these legs by being attached thereto in firm face-to-face contact. Between segments 1B and 1C are interposed segments 2 in apposition, presenting a gap 3. All these yoke segments constitute a gapped magnetic circuit, whose face is thus formed by segments 1B, 1C and 2 with gap 3 at the middle thereof. Considering the width of this face, width A at segments 2 is greater than the width of the magnetic tape; that is width A is greater than the length of gap 11 provided in the face of record-reproduce head 10 to be degaussed. Width B of the yoke face at legs 4, not adjacent to the gap 3 but remote thereto at the sides thereof, i.e., at segments 1B and 1C, is sized slightly narrower than the magnetic tape. Coils 6 and 7 are included on frame 5 and mounted on yoke 1 in conventional electromagnet construction. Shock-absorbing lining 8, made of a plastic or similar material, covers the electromagnet face presented by yoke segments 1B, 1C and 2.

In the above example, the width of the yoke face at legs 4 is narrower than the tape, so that tape guide 12 with its tape guiding recess 12a does not prevent the electromagnet from coming close to record-reproduce head 10, and thus allows the head face to experience full degaussing action. In other words, the wider-than-tape width of the electromagnet face at the yoke segments 2, directly opposite the active gap 11 of head 10, subjects the entire sliding face of head 10 to strong degaussing action. The feature of the narrow face portions of legs 4 fitting into the recess 12a of tape guide 12 provides a means of preventing the electromagnet from being displaced from its normal degaussing position with respect to record-reproduce head 10. When the electromagnet is brought against the head 10 for a degaussing operation, shock-absorbing lining 8 prevents yoke 1 from coming into direct contact with the gapped sliding face of head 10, and thus protects this critical face from the deteriorating effect of two hard faces colliding with each other.

Figure 3:
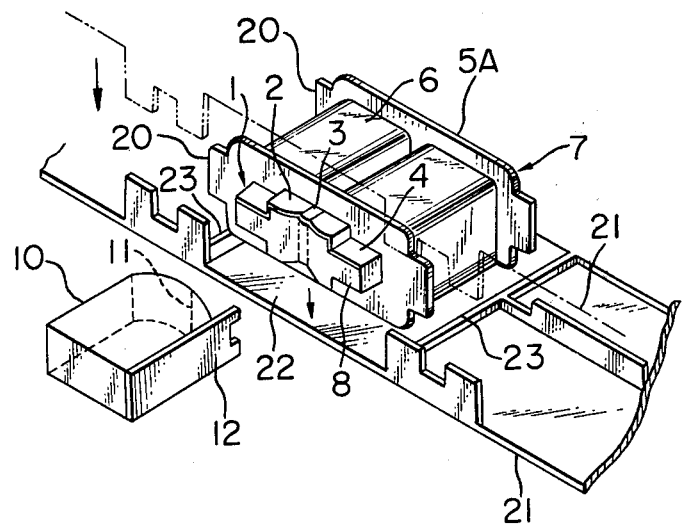

In the second example of this invention shown in FIG. 3, the flanges, front and rear, of frame 5A have a straightly protruding lug 20 formed of each flange end. These lugs 20, identically shaped and sized, fit snugly into and between top and bottom rails 23 formed of or provided in cassette case 21. There are two rails 23, one on each side of the degaussing electromagnet, to allow the electromagnet to move freely toward and away from record-reproduced head 10 and to hold the electromagnet in hole 22 formed in cassette case 21, the hole 22 being the head inserting hole. It should be noted that cassette case 21 is of conventional construction, being in two split halves; the top half is indicated by dot-and-dash lines in FIG. 3, and the arrows indicate the directions in which the electromagnet and the top half are moved in assembling an electromagnet-containing cassette case. All other features of the degaussing electromagnet are substantially the same as those of the first example described above in reference to FIGS. 1 and 2.

Since the assembly of FIG. 3 embodies a degaussing electromagnet which is slidable back and forth with respect to the record-reproduce head and is mounted in cassette case 21, it provides the advantage of allowing the electromagnet to be resiliently urged against the gapped face of head 10 to be degaussed. With this advantage, coupled with those advantages possessed by the assembly of FIGS. 1 and 2, the assembly of FIG. 3 serves as a simple and easy-to-use means of degaussing the record-reproduce head in a cassette tape recorder.

In the two examples described, shock-absorbing lining 8 is shown as attached to the face of yoke 1; instead of this lining, the same face may be coated with a material such as a synthetic resin so that the coating will act as a shock-absorbing overlay.

It will be noted from the foregoing description that an electromagnet capable of positively and reliably degaussing the record-reproduce head in an existing magnetic tape device is provided because, according to this invention, the width of the middle face of yoke 1 is sized wider, and the width of the end portions of the same yoke face are sized narrower, than the magnetic tape. It is apparent that modifications of the presently preferred embodiments may be made. The invention, therefore, should be taken to be defined by the following claims.

I claim:

1. In a demagnetizer for a magnetic head of a recording-reproducing device, which demagnetizer includes an electromagnet for producing a varying magnetic field, the improvement in which said electromagnet comprises a yoke having a yoke face with a gap therein designed for interacting magnetically with said magnetic head, the middle portion of said yoke face, at and adjacent to said gap, being wider than the side portions of said face away from said gap thereby to effect an enhanced magnetic interaction.

2. A demagnetizer according to claim 1, in which said middle portion of said yoke face is wider than the magnetic tape that passes by said magnetic head, and said side portions of said yoke face are narrower than said tape.

3. A demagnetizer according to claim 1 or 2, in which said recording-reproducing device includes a tape guide for guiding a magnetic tape past said magnetic head, and said guide is slotted to receive said side portions of said yoke face therein and to permit face-to-face contact between said electromagnet and said magnetic head.

4. A demagnetizer according to claim 3, including rail means for supporting said electromagnet for movement toward and away from said magnetic head.

* * * * *